United States Patent
Epicureo et al.

(10) Patent No.: US 10,221,004 B2
(45) Date of Patent: Mar. 5, 2019

(54) VALVE DESIGNED TO INDICATE WHETHER OR NOT FLUID IS PASSING

(75) Inventors: Giulio Epicureo, Lille (FR); Chun Chi Liu, Longtan Township (TW)

(73) Assignee: CIE EUROPE, Lomme (FR)

(*) Notice: Subject to any disclaimer, the term of this patent is extended or adjusted under 35 U.S.C. 154(b) by 266 days.

(21) Appl. No.: 13/697,942

(22) PCT Filed: May 21, 2010

(86) PCT No.: PCT/FR2010/050989
§ 371 (c)(1),
(2), (4) Date: Dec. 14, 2012

(87) PCT Pub. No.: WO2011/144821
PCT Pub. Date: Nov. 24, 2011

(65) Prior Publication Data
US 2013/0112585 A1    May 9, 2013

(51) Int. Cl.
| | | |
|---|---|---|
| B65D 81/20 | (2006.01) | |
| F16K 15/20 | (2006.01) | |
| F16K 37/00 | (2006.01) | |
| F16K 51/02 | (2006.01) | |

(52) U.S. Cl.
CPC ..... B65D 81/2038 (2013.01); B65D 81/2023 (2013.01); F16K 15/20 (2013.01); F16K 37/0058 (2013.01); F16K 51/02 (2013.01); *Y10T 137/7903* (2015.04); *Y10T 137/7908* (2015.04); *Y10T 137/8225* (2015.04); *Y10T 137/8326* (2015.04); *Y10T 137/86083* (2015.04)

(58) Field of Classification Search
CPC .................. B65D 81/2038; B65D 81/2023

USPC .............. 137/553, 554, 557, 565.13, 565.23; 206/524.8
See application file for complete search history.

(56) References Cited

U.S. PATENT DOCUMENTS

| | | | |
|---|---|---|---|
| 4,108,205 A | | 8/1978 | Hawley |
| 6,029,810 A | * | 2/2000 | Chen ...................... A47G 25/54 206/287 |
| 7,298,280 B2 | * | 11/2007 | Voege ................. G01P 13/0013 128/200.11 |
| 2009/0020170 A1 | * | 1/2009 | Anderson ............. B60C 23/003 137/492.5 |
| 2011/0162995 A1 | | 7/2011 | Epicureo |

FOREIGN PATENT DOCUMENTS

| | | |
|---|---|---|
| FR | 2935693 A1 | 3/2010 |
| GB | 2365947 B | 2/2002 |
| WO | 198500868 A1 | 2/1985 |
| WO | 2004076283 A2 | 9/2004 |

OTHER PUBLICATIONS

European Patent Office, International Search Report and Written Opinion in International application No. PCT/FR2010/050989, dated Mar. 28, 2011.

* cited by examiner

*Primary Examiner* — Kevin Murphy
*Assistant Examiner* — Kelsey Cary
(74) *Attorney, Agent, or Firm* — Hunton Andrews Kurth LLP

(57) ABSTRACT

The subject of the present invention is a valve for extracting, by pumping, a fluid contained in a space, said valve comprising: a) a main body having a first opening for the passage of said fluid during pumping, and b) an indicator means configured to indicate whether or not the fluid is passing through the first opening.

13 Claims, 3 Drawing Sheets

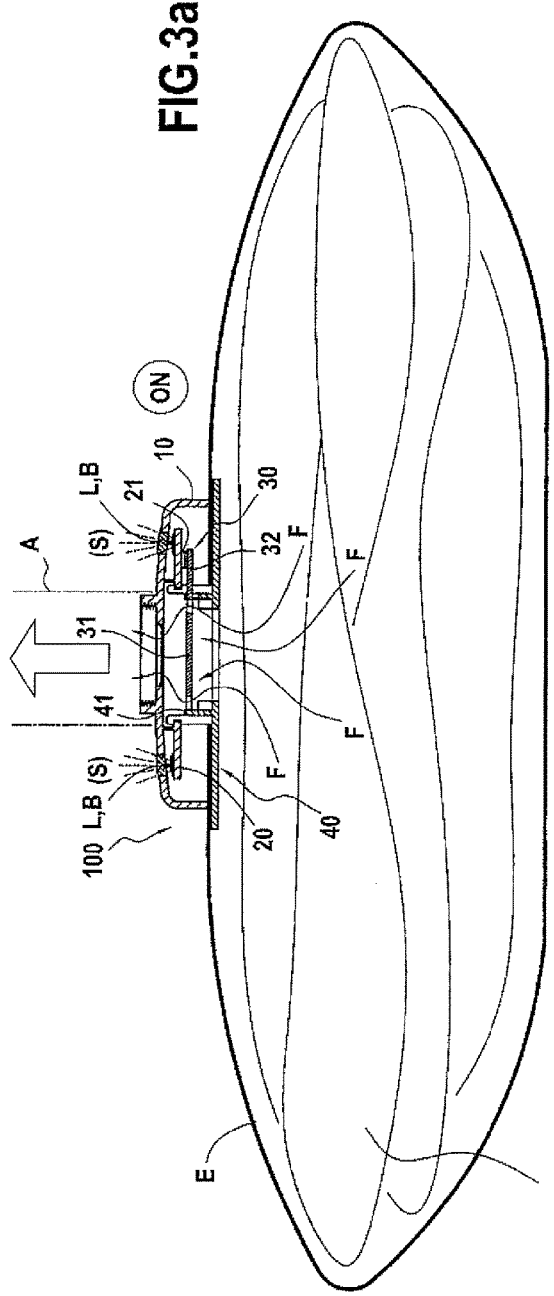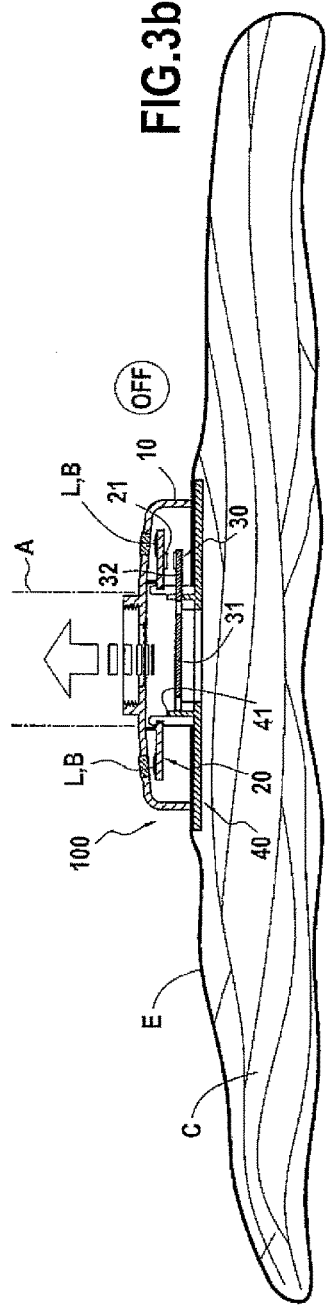

VALVE DESIGNED TO INDICATE WHETHER OR NOT FLUID IS PASSING

CROSS REFERENCE TO RELATED APPLICATION

This is a 371 national phase application of International Application No. PCT/FR2010/050989, filed May 21, 2010, the content of which is incorporated herein by reference in its entirety.

TECHNICAL FIELD

The object of the present invention relates to the field of containers for storing and/or transportation of articles; the object of the present invention relates more particularly to storage covers designed for storing and/or transporting bulky compressible articles such as for example textile articles (comforters, pillowcases, clothing, outdoor furniture cushions, etc.) while reducing their bulk volume.

The object of the present invention relates more precisely to the field of valves specially designed for such containers or such storage covers.

What is meant by valve in all of the present description that follows is any type of device that a) provides, in its closed position, a perfect fluid-tight seal for a container such as a storage cover and, b) enables, in its open position, on the one hand the compression of the container and of its content when the air inside it is pumped or aspirated, and on the other hand the decompression of said container and of its content when said valve is left free.

What is meant by pumping in all of the present description that follows is any type of operation consisting of pumping or of aspirating a fluid contained in a container so as to extract said fluid from the container. This operation can be accomplished by any pumping equipment such as for example a pump or a vacuum cleaner.

PRIOR ART

Storage covers are known in the prior art which are designed to allow reduction of the bulk of the articles such as textile articles of the comforter, pillowcase, clothing, outdoor furniture cushion, etc. type.

In this field, the applicant holds patent application FR 2008/055 988 filed in 2008; the applicant markets such storage covers under the trade name COMPACTOR®.

Generally, in this type of system, an article, such as a textile article which is by nature bulky and compressible, must first be placed in the storage cover.

In order to reduce the bulk of said article it is necessary, using a specific pump or a simple vacuum cleaner, to pump or aspirate through a valve the air contained inside the storage cover and in the article.

This pumping operation enables the extraction of air from the storage cover so as to create within said cover a vacuum or quasi-vacuum.

This extraction of air contained inside the cover is particularly effective in terms of bulk reduction: the applicant is particularly satisfied with the results obtained in terms of bulk reduction with this kind of storage cover.

However, on this kind of cover, the valve systems used are simple, and their mechanism is relatively basic.

It has been observed by the applicant that certain disadvantages result from the simplicity of these valve systems.

Indeed when, during pumping, a vacuum is created inside the cover, and the user continues to pump, the pump or vacuum cleaner, and its components in particular, deteriorates.

More precisely, in this case, the pump or vacuum cleaner is pumping vacuum, which can cause deterioration of the pump or the vacuum cleaner that is used.

It is also possible that the structure of the cover will tear if the material constituting it is not strong enough, and pumping continues for an extended period.

It is therefore noted that the valves known in the prior art do not offer a satisfactory solution suited to this type of use.

OBJECT AND SUMMARY OF THE PRESENT INVENTION

The object of the present invention is to contribute a simple and effective solution to the aforementioned problems among other problems; the constraints connected to costs and to manufacture being quite obviously taken into consideration within the framework of the present invention.

One of the technical problems resolved by the object of the present invention therefore consists of proposing a solution aiming to improve pumping or aspiration; this simple, easy to use, esthetic and fun solution, proposing a valve taking into account the constraints of light weight, toughness and fluid-tightness connected with bulk reduction of the objects contained within the cover.

To this end, the object of the present invention relates to a valve for extracting by pumping a fluid contained inside an enclosure such as a storage cover, the enclosure being designed to accommodate and to contain an article such as a textile article.

The valve according to the present invention is particularly suited to allowing compression of the enclosure and its content.

The valve according to the present invention comprises a main body which exhibits a first opening for passage of the fluid during pumping.

What is meant by fluid in all of the present description is any type of liquid, of gas such as air, or of slurries capable of being contained within an enclosure such as a container or a storage cover.

The valve according to the present invention also comprises a signaling means configured to indicate whether or not said fluid is passing through the first opening.

Advantageously, the signaling means is configured to emit at least one signal.

Preferably, the signal emitted by the signaling means is a light and/or an audible signal.

In the case where the signal emitted is a light signal, the signaling means comprises at least one light source such as an LED; in the case where the signal is an audible signal, the signaling means comprises at least one sound source such as a "buzzer".

Advantageously, in a first variant, the signaling means is configured to emit an audible signal when, during pumping, fluid is passing through the first opening.

Advantageously, in a second variant, the signaling means is configured to emit a signal when the enclosure is emptied of fluid and the fluid is no longer passing through the first opening.

In one variant as in the other, the user of the storage cover or of the container comprising the valve according to the present invention is alerted as to whether or not the pumping that he is carrying out is enabling extraction of the fluid through the first opening.

Depending on the indication provided by the signaling means, he may decide either to continue or not the pumping of the fluid as well as the operation of compressing the storage cover.

The valve according to the present invention therefore allows control and checking of the pumping or of the aspiration in an intuitive manner so as to avoid any deterioration of the pumping or aspiration means caused by prolonged and excessively long use of said means.

Advantageously, the signaling means comprises a switch allowing control of the emission of the signal.

The valve according to the present invention advantageously comprises a triggering means capable of exhibiting at least two positions, a first position and a second position.

As mentioned above, the first implementation variant of the present invention corresponds to the case wherein the signaling means is configured to emit a signal when, during pumping, the fluid is passing through the first opening.

For said first variant, in the first so-called rest position the fluid is not passing through the first opening; in this position, nothing happens, the triggering means is not in contact with the switch.

Still according to this first variant, in the second so-called active position, the fluid during pumping is passing through the first opening; in this position, the triggering means comes into contact with the switch, which causes the signal to be emitted.

In this first implementation variant, the signaling means and the triggering means are therefore positioned together so that, in the first position, the signal is not emitted, and in the second position the signal is emitted.

The user of such a valve according to the present invention will therefore be able to intuitively determine whether the fluid pumping operation is effective or not by looking to see whether or not the signaling means indicates that fluid is passing.

More precisely, if a signal is emitted, this indicates that it is still possible to pump the fluid contained inside the enclosure; and if the signal is not emitted, this indicates that it is no longer necessary to continue pumping.

As mentioned above, the second implementation variant of the present invention corresponds to the case wherein the signaling means is configured to emit a signal when the enclosure is emptied of fluid and fluid is no longer passing through the first opening.

Alternatively, for this second implementation variant, in the first, so-called active position, the enclosure is emptied of the fluid and fluid is no longer passing through the first opening; in this position, the triggering means is in contact with the switch.

Still according to this second variant, in the second, so-called rest position, fluid is passing through the first opening; in this position, the triggering means is not in contact with the switch.

Alternatively to the first variant, in this second implementation variant the signaling means and the triggering means are therefore positioned together so that, in the first position, the signal is emitted and, in the second position, the signal is not emitted.

The user of such a valve according to the present invention will therefore be able to intuitively determine whether or not the fluid pumping operation is effective by looking to see whether or not the signaling means indicates that fluid is passing.

More precisely, if a signal is emitted, this indicates that the enclosure is emptied of its fluid and that it is no longer necessary to continue pumping; and if the signal is not emitted, this indicates that it is still possible to pump the fluid contained in the enclosure.

Advantageously, the triggering means comprises a cap made of lightweight material capable of being set in motion by the force of the thrust exerted on the cap by the passing of fluid.

In other words, the cap is able to be set in motion when it is subjected to a predetermined thrust force which is caused by the fluid being pumped.

Advantageously, the triggering means comprises an arm capable of coming into contact with the switch.

Advantageously, the valve according to the present invention comprises a base which is capable of being assembled with a main body and designed to be fixed to the inside of the enclosure.

This base exhibits a second opening for passing air during pumping.

Advantageously, the valve according to the present invention comprises a guiding means capable of enabling the guiding of the triggering means.

Advantageously, the main body is at least partially made of a translucent material.

Advantageously, the valve according to the present invention comprises a closure element which is capable of covering the first opening and which is positioned with the main body so as to allow hermetic closure of the enclosure.

Correlatively, the object of the present invention also relates to a storage cover capable of allowing the compression and the storage of at least one article such as a textile article.

Advantageously, the storage cover according to the present invention comprises a valve like that described above, said valve allowing the extraction, by pumping, of the air contained inside the storage cover.

Thus, the object of the present invention, by its different functional aspects and its advantageous features, corrects the different disadvantages noted in the prior art by allowing control of pumping or aspiration and thus avoiding the different deteriorations noted with valve systems identified in the prior art.

BRIEF DESCRIPTION OF THE FIGURES

Other features and advantages of the present invention will appear from the description below, with reference to the appended FIGS. 1 through 3a-3b which illustrate one embodiment of it devoid of any limiting effect and wherein:

FIG. 1b shows schematically an exploded perspective view of a valve conforming to the embodiment of the present invention illustrated in FIG. 1a;

FIG. 3a shows a valve according to one particular embodiment of the present invention wherein the signaling means emits a signal when the air contained in the enclosure is passing through the valve opening;

FIG. 3b shows a valve according to the one particular embodiment of the present invention wherein the signaling means no longer emits a signal when all of the air contained in the enclosure has passed through the valve opening.

DETAILED DESCRIPTION OF AN EMBODIMENT OF THE PRESENT INVENTION

A valve and a storage cover conforming to a particular embodiment of the present invention will now be described in what follows with reference jointly to FIGS. 1 through 3a-3b.

As a reminder, as mentioned previously, it has been observed in the prior art that the pumping of air contained in storage covers for the purpose of compression and storage of at least one textile article can be the cause of deterioration of the pumping equipment.

Indeed, when pumping or aspiration is continued when maximum compression of the article has already been attained, the different components of the pumping equipment can be deteriorated; furthermore, it is useless to continue pumping in a vacuum.

One of the objectives sought by the object of the present invention is to allow the user of the pump or the vacuum cleaner to be warned that, during compression, the storage cover is emptied of its air.

First of all it is recalled that the term pumping equipment must be understood in all of the present description that follows to mean any type of device capable of allowing the pumping or the aspiration of a fluid such as air contained in an enclosure such as a storage cover.

For the sake of clarity, the term "vacuum cleaner" is employed in what follows to express the generic term "pumping equipment". Quite obviously, it must be understood that this can also be any other type of means such as for example a simple manual pump, an electric pump or any other means allowing extraction of the air.

As mentioned above, the object of the present invention is specially suited for preventing possible deteriorations of the different components of the vacuum cleaner which can occur during pumping of the air contained in an enclosure.

The object of the present invention also makes it possible for the user of the vacuum cleaner to avoid pumping unnecessarily.

To this end, the object of the present invention relates to a valve 100 for extracting by pumping the air F contained in an enclosure E, and more precisely a storage cover E; the valve 100 according to the present invention is designed to be positioned or fixed on the storage cover E.

Preferably, in the example described here, the valve 100 is a check-valve.

In the example described here, the storage cover E contains textile articles C which are bulky by nature and which are compressible: these can be at least one comforter and/or a pillowcase and/or clothing, etc.

Figure 1A:
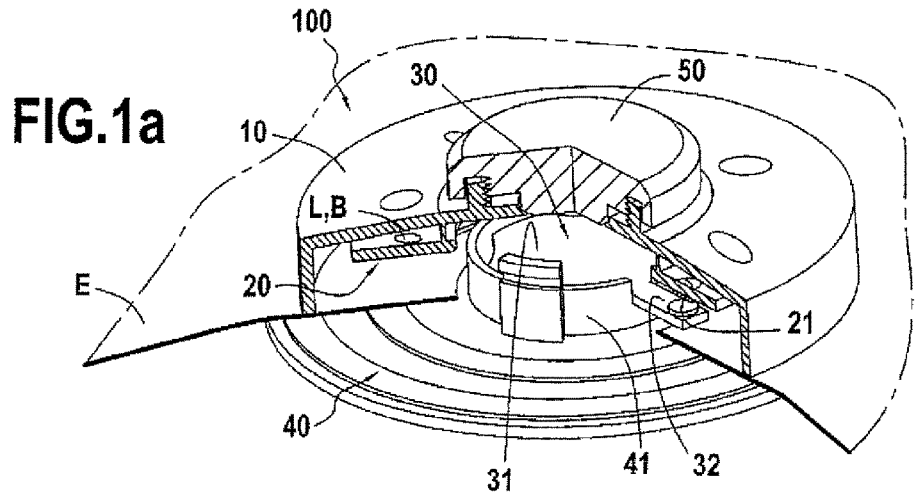
FIG. 1a shows schematically a perspective view of a valve according to one embodiment of the present invention.
Figure 1B:
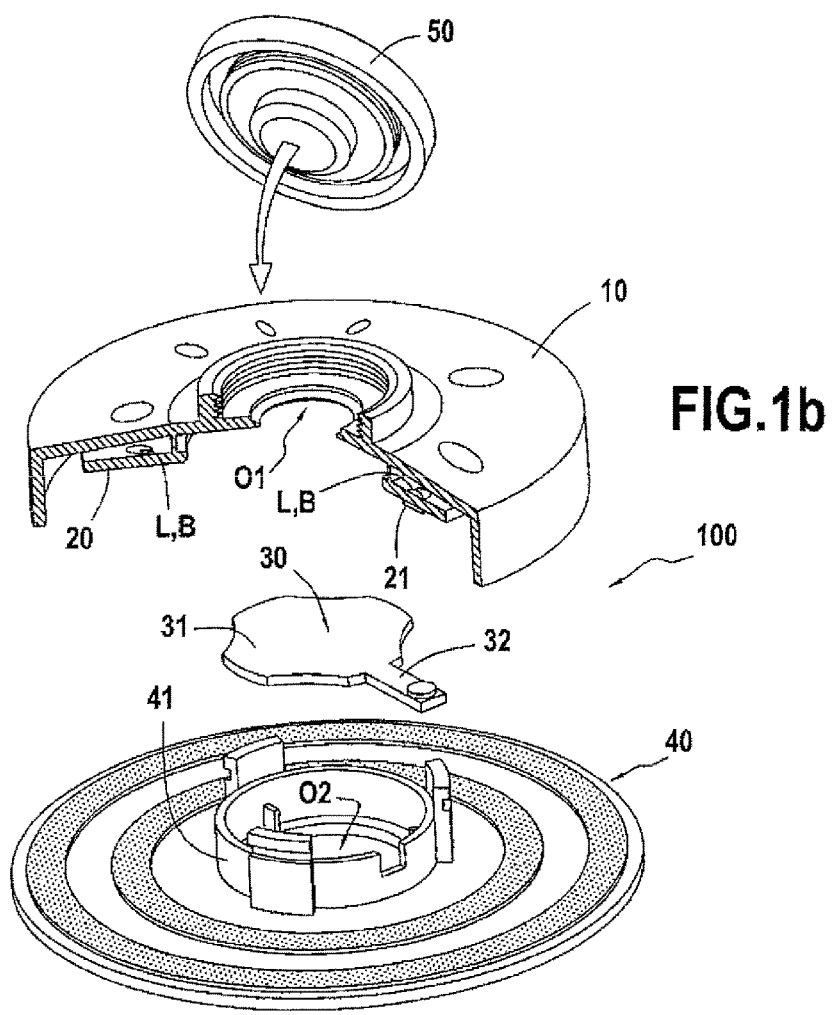

As regards structure, in the example described here and as illustrated particularly in FIGS. 1a and 1b, the valve 100 according to the invention comprises a main body 10.

As illustrated in FIG. 3a, the main body 10 of the valve 100 has a first opening O1 for passage of the fluid F during pumping.

Figure 2:
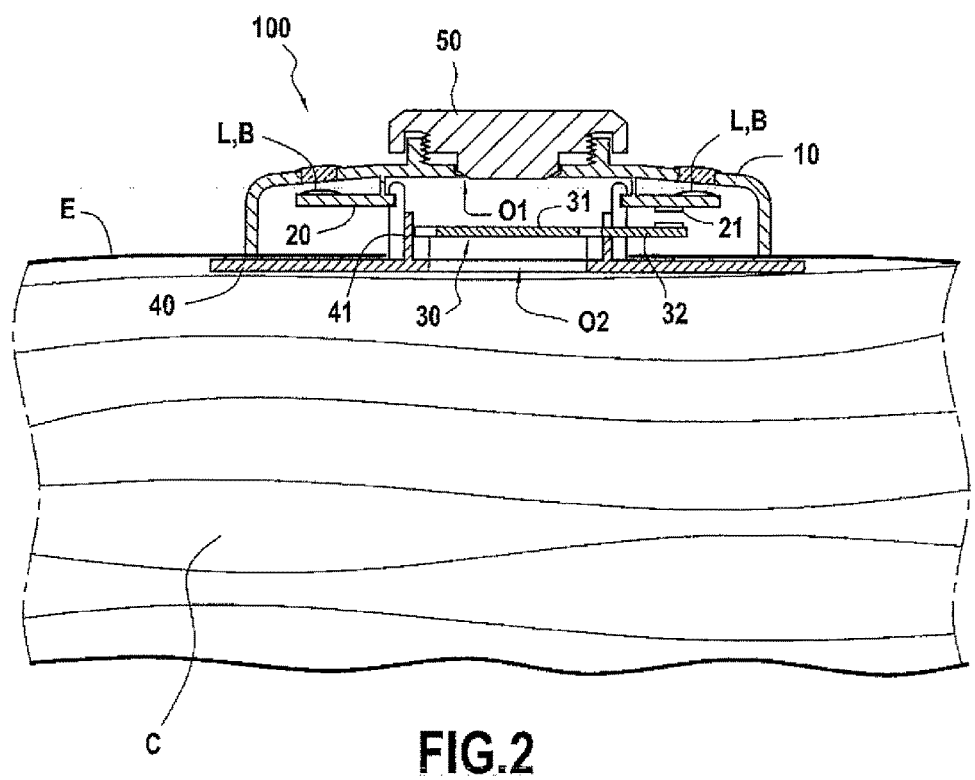
FIG. 2 shows a schematic section view of a storage cover comprising a valve according to the present invention, and containing within it a textile article.

In the example described here, and as illustrated particularly in FIGS. 1b and 2, the valve 100 according to the present invention also comprises a base 40 capable of being assembled with the main body 10 and designed to be fixed inside the storage cover E.

As illustrated in FIG. 3a, the base 40 of the valve 100 has a second opening O2 for passage of the fluid F during pumping.

In the example described here, the main body 10 and the base 40 are assembled together by snapping. Quite obviously, it must be understood that within the scope of the present invention any other type of assembly can be contemplated: assembly by threading, by adhesion, etc.

As a reminder, the user of the valve 100 according to the present invention must be notified whether or not the pumping of the air F contained in the storage cover E is effective, this in order to attain the different aforementioned objectives.

To this end, the valve 100 according to the present invention comprises a signaling means 20 which is specially configured to indicate whether or not fluid F is passing through the first opening O1.

In the example described here, and as illustrated in FIG. 3a, in order to notify said user, the signaling means 20 is configured to emit a signal S, preferably visual and/or audible, when, during pumping, the fluid F is passing though the first opening O1.

Preferably, in the example described here, the signaling means 20 comprises at least one light source L such as an LED and/or at least one sound source B such as a buzzer.

Preferably, the main body 10 consists at least partially of a translucent material so as to allow light to pass for the mode wherein the signal emitted is a visual signal.

In the example described here, the signaling means 20 comprises a switch 21 allowing control of the emission of the signal S.

Allowing automation of that control is characteristic of the present invention.

To this end, the valve 100 according to the present invention includes a triggering means 30 positioned to cooperate with the switch 21.

In the example described here, and as illustrated particularly in FIGS. 1b and 3a, the triggering means 30 comprises: a) a movable cap 31 consisting of a lightweight material capable of being set in motion by the force of the thrust exerted by the passage of the fluid F; and b) an arm 32 configured to come into contact with the switch 21 during pumping.

More precisely, the triggering means is able to show at least two ON/OFF positions.

Thus, in the example described here, and as illustrated in FIG. 3b, the first OFF position, called the resting position, is a position wherein, when the fluid F is not passing through the first opening O1, the arm 32 of the triggering means 30 is not in contact with the switch 21.

In this case, nothing happens.

As illustrated in FIG. 3a, the second ON position, called the active position, is a position wherein, when the fluid F is passing through the first opening O1, the cap 31 is lifted so that the arm 32 of the triggering means 30 comes into contact with the switch 21.

In this case, the fact that the arm 32 comes into contact with the switch 21 as illustrated in FIG. 3a allows emission of the signal S.

Thus, as illustrated in FIG. 3a, when the user places the vacuum cleaner A on the main body 10 of the valve 100 in order to extract the air F contained in the storage cover E, and the user turns on the vacuum cleaner A, the air F passes through the first O1 and second O2 openings, which causes the movement of the cap 31 and the arm 32 from the first OFF position to the second ON position.

In this second ON position corresponding to the "pumping" mode, the switch 21 will cause the emission of the signal(s) S so as to indicate to the user that the air F is passing through the first opening O1, and therefore that pumping is effective.

Thereafter, once the compression of the article C is obtained and the storage cover E is emptied of its air F, pumping of the air F is no longer effective: the vacuum clean is pumping "vacuum".

In this case, thanks to the signaling means 20 and to the triggering means 30, the cap 31 falls back; the arm 32 is no longer in contact with the switch 21.

The triggering means 30 is in the second OFF position: in this OFF position, the signal S is no longer emitted to alert the user to the pumping.

In other words, the stopping of the emission of the signal S indicates to the user that the enclosure E is emptied of its air F and that it is no longer necessary to continue aspiration.

It is understood that in the embodiment described here, the signal S is emitted during passage of the air F through the first opening O1.

Alternatively, and as mentioned previously, provision of another configuration can be contemplated, wherein the signal S is emitted in the case where the emptying of the storage cover E is attained and the air F is no longer passing through the first opening O1.

Though not described here, this alternative embodiment is accessible to the person skilled in the art who, to change from one embodiment to the other, needs only to reverse the arrangement of the elements constituting the valve 100 described above so that, during pumping, no signal is emitted, and once the pumping is finished the valve is able to emit a signal.

Advantageously, the base 40 of the valve 100 comprises a guide means 41 configured to enable guiding of the triggering means 30 and in particular to facilitate guiding for switching from the first OFF position to the second ON position or conversely.

In the example described here, this guide means 40 consists of a simple hollow cylinder which allows the movement of the cap 31 inside it and which exhibits at its upper portion a groove for passage of the arm 32.

Advantageously, as illustrated in FIG. 3a or 3b, the valve 100 according to the present invention comprises a closure element 50 which is capable of covering the first opening O1 and which is positioned with the main body 10 to enable hermetic closure of the storage cover E.

In the example described here, the closure of the storage cover E is obtained by threading the closure element 50 onto the main body 10.

Thus, the user who has available a storage cover E comprising a valve 100 according to the present invention will be able to proceed with optimal pumping of the cover E and of its content C for the purpose of compressing it.

In the embodiment described here, it suffices for the user to place the vacuum cleaner A at the valve 100, then to pump the air F so as to compress the textile article C contained inside the cover E.

Throughout pumping, as long as air F is passing through the first opening O1 of the valve, the signaling means 20 emits a signal S which indicates to the user that the pumping is effective.

Once complete compression of the article is attained, and the air F is no longer passing through the first opening O1, the signal S is no longer emitted; this indicates to the user that it is no longer necessary to pump.

The solution contributed by the present invention therefore makes it possible to indicate to the user whether or not the air F is passing through the first opening O1 so that the latter can proceed with optimal compression of the storage cover E and of its content C.

It must be observed that this detailed description relates to one particular embodiment of the present invention, but that in no case does this description assume any character limiting the object of the invention; quite the contrary, it has the objective of removing any possible imprecision or any misinterpretation of the claims that follow.

The invention claimed is:

1. A storage and compression cover capable of allowing storage of at least one textile article comprising a valve for extracting a fluid contained in said cover by pumping, said valve comprising a main body having a first opening for passage of said fluid during pumping and a base assembled to the main body and designed to be fixed inside the cover, said base exhibiting a second opening, a passageway being formed between the first and second openings for passage of said fluid during pumping, wherein said cover further comprises a closure element capable of covering the first opening and positioned with the main body so as to allow hermetic closure of the cover in a closed position, and said valve having:

the aforesaid closed position, where the storage and compression cover is hermetically closed, and an open position, where said fluid can be extracted by pumping through the first opening, the cover being not hermetically closed, wherein said valve also comprises a signaling device configured to distinguish while the valve is in its open position with an operating vacuum pump in fluid communication with the cover via the valve, between a first state where the fluid is extracted by pumping through the first opening, and a second state where the storage and compression cover is emptied of fluid, the signaling device being configured to emit a signal and comprising a switch allowing control of the emission of the signal, the valve comprising a triggering member capable of exhibiting at least a first and a second positions corresponding respectively to the first and the second states, the triggering member including an independent movable cap made of a lightweight material, disposed between the first opening and the second opening, and being set in motion between the first and the second positions by the force of the thrust exerted by the passing of the fluid through the first opening directly applied onto the movable cap, during pumping, the triggering member being arranged between the closure element and the base, wherein the triggering member comprises an arm configured to come into contact with the switch, said arm projecting laterally from the movable cap, and the switch being arranged outside said first and second openings, and wherein the valve comprises a guide device guiding the triggering member and consisting of a hollow cylinder receiving the independent movable cap inside said hollow cylinder and having at its upper portion a groove for passage of the arm.

2. The storage and compression cover according to claim 1, wherein the signal is emitted during pumping when, during pumping, the fluid is passing through the first opening.

3. The storage and compression cover according to claim 2, wherein the triggering member exhibits a first so-called rest position wherein, when the fluid is not passing through the first opening, the valve being in its open position, the triggering member is not in contact with the switch, and a second so-called active position wherein, when the fluid is passing through the first opening, the triggering member is in contact with the switch.

4. The storage and compression cover according to claim 1, wherein the signal is emitted when the valve is in its open position, the cover being emptied of the fluid and the fluid no longer passing through the first opening.

5. The storage and compression cover according to claim 4, wherein the triggering member exhibits a first so-called active position wherein, the valve being in its open position, when the cover is emptied of fluid and the fluid is no longer passing through the first opening, the triggering member is in contact with the switch, and a second so-called rest position wherein, when the fluid is passing through the first opening, the triggering member is not in contact with the switch.

6. The storage and compression cover according to claim 1, wherein the main body consists at least partially of a translucent material.

7. The storage and compression cover according to claim 1, the signaling device being configured to emit a visual signal, wherein the signaling device comprises at least one light source.

8. The storage and compression cover according to claim 7, said at least one light source being an LED.

9. The storage and compression cover according to claim 1, the signaling device being configured to emit an audible signal, wherein the signaling device comprises at least one sound source.

10. The storage and compression cover according to claim 9, said at least one sound source being a buzzer.

11. The storage and compression cover according to claim 1, wherein said closure element is distinct from the triggering member.

12. The storage and compression cover according to claim 1, wherein the triggering member is designed to not hermetically cover any opening of the valve in any position.

13. The storage and compression cover according to claim 1, wherein the triggering member is dimensioned so as to partially cover the second opening.

* * * * *